Aug. 26, 1924.
F. J. NOWAK
TELESCOPE
Filed May 27, 1922
1,506,658
2 Sheets-Sheet 1
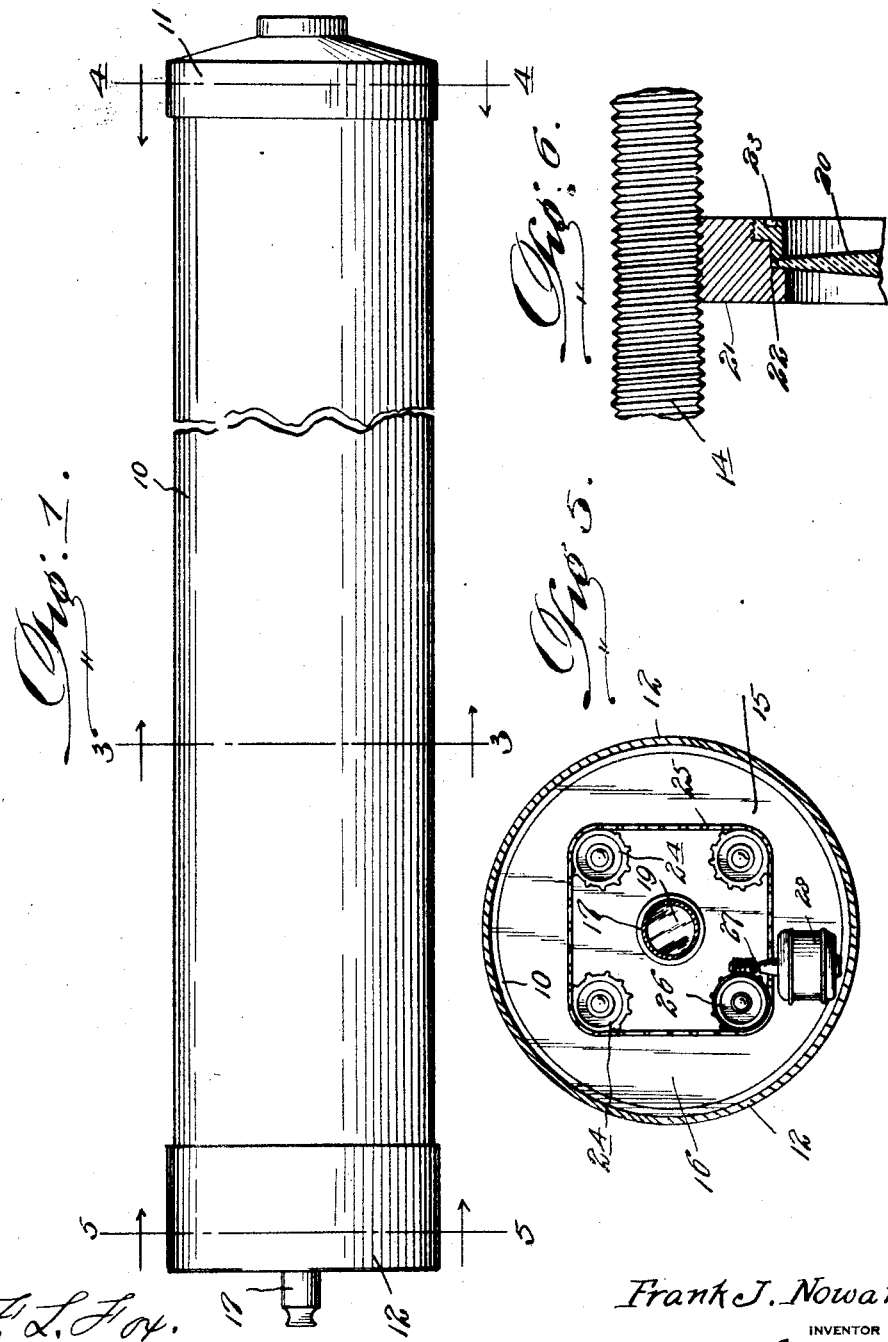
Frank J. Nowak,
INVENTOR
BY Victor J. Evans
ATTORNEY
WITNESSES:

Aug. 26, 1924.
F. J. NOWAK
TELESCOPE
Filed May 27, 1922    2 Sheets-Sheet 2
1,506,658
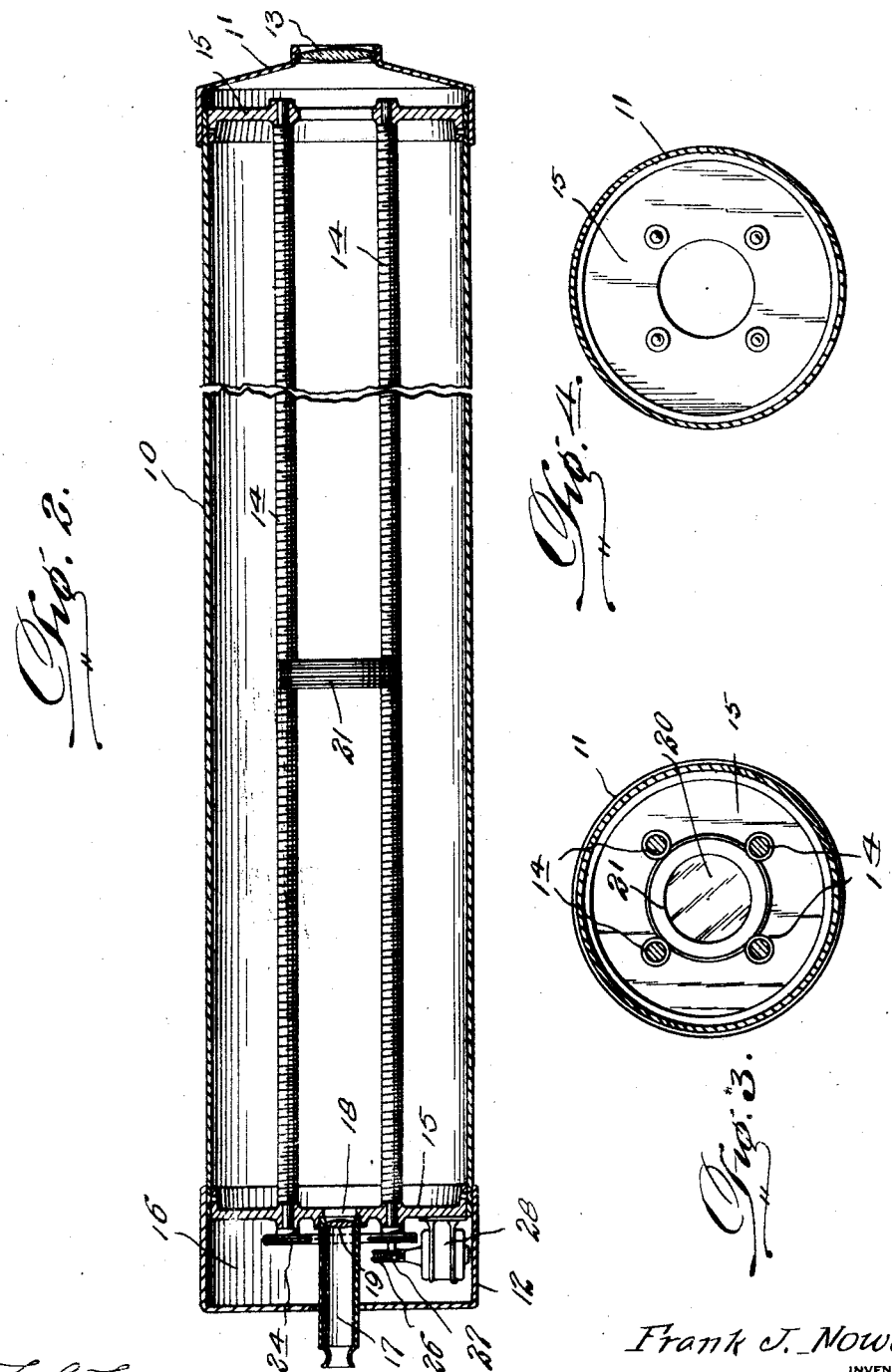
Frank J. Nowak
INVENTOR Patented Aug. 26, 1924.

1,506,658

UNITED STATES PATENT OFFICE.

FRANK J. NOWAK, OF WASHINGTON, DISTRICT OF COLUMBIA.

TELESCOPE.

Application filed May 27, 1922. Serial No. 564,104.

*To all whom it may concern:*

Be it known that I, FRANK J. NOWAK, a citizen of the United States, residing at Washington, in the District of Columbia, have invented new and useful Improvements in Telescopes, of which the following is a specification.

This invention relates to improvements in telescopes and has especial relation to high powered telescopes primarily designed for astronomical work.

An object of the present invention is the provision of a high powered telescope of simple construction and operation, by means of which the range of vision is materially increased and objects greatly enlarged and their distinctness accentuated.

Another object of the invention is the provision of power operated means for adjusting the focus of the telescope, whereby a telescope of a relatively large size may be easily and quickly adjusted.

Another object of the invention is the provision of novel means for mounting and arranging the power operated means, whereby the latter will be contained entirely within the telescope casing.

With the above and other objects in view, the invention further includes the following novel features and details of construction, to be hereinafter more fully described, illustrated in the accompanying drawings and pointed out in the appended claim.

In the drawings:—

Figure 1 is an elevation of a telescope constructed in accordance with the invention.

Figure 2 is a longitudinal sectional view of the same.

Figure 3 is a section on the line 3—3 of Figure 1.

Figure 4 is a similar view on the line 4—4 of Figure 1.

Figure 5 is a like view on the line 5—5 of Figure 1.

Figure 6 is a detail sectional view illustrating the connection between the adjustable lens and the adjusting means therefor.

Referring in detail to the drawings, wherein like characters of reference denote corresponding parts, the reference character 10 indicates a telescope casing which is of cylindrical formation and is closed at one end by a head 11 and at the opposite end by a head 12, the first mentioned head being provided with a lens 13, hereinafter termed the view lens.

Located within the casing 10 is a plurality of spaced parallel shafts 14, which are capable of rotation and for this purpose are mounted in bearing members 15 located at each end of the casing 10. The bearing member 15 at the inner end of the casing is spaced from the head 12 so as to provide a chamber or compartment 16 while extending through this chamber or compartment from the bearing member 15 and through the head 12 is a tubular member 17 whose inner end registers with an opening 18 provided in the bearing member 15. A lens 19 is located at the inner end of the tubular member 17 and this lens will be hereinafter referred to as the eye lens and may be positioned at any point within the length of the tubular member 17.

Supported by and located between the spaced parallel shafts 14 is an adjustable lens 20. This lens is located within a circular exteriorly threaded frame 21, being held within said frame between a shoulder 22 and a removable ring or annulus 23 which has a threaded engagement with the frame 21. The frame 21 engages threads which extend throughout the length of the shafts 14, so that when the said shafts are rotated, the lens 20 will be moved longitudinally of the casing and adjusted relatively to the lenses 13 and 19.

Located within the compartment 16 upon the ends of each of the shafts 14 is a sprocket wheel 24, the said wheels being connected by an endless chain 25, so that when one shaft is rotated, simultaneous rotary motion will be imparted to the remaining shafts and all of said shafts will be rotated in a common direction and thus effect adjustment of the adjustable lens 20. One of the shafts 14 is provided with a worm gear 26, which is engaged by a worm 27 operated by a motor 28, which may receive current from any suitable source, the said motor being of the reversing type, whereby the shafts may be rotated in either direction to control the direction of movement of the focal lens 20.

The heads 11 and 12 may be removably secured upon the casing 10, so that access may be had to either end of the shafts 14, or to the rotating mechanism therefor.

The invention is susceptible of various changes in its form, proportions and minor details of construction and the right is herein reserved to make such changes as properly fall within the scope of the appended claim.

Having described the invention what is claimed is:—

A telescope comprising a casing, a bearing member extending transversely of the casing and spaced from the ends thereof and provided with a central opening, a lens at one end of the casing and disposed axially of the bearing member openings, a tubular member extending from the other bearing member opening through the end of the casing, a lens at the inner end of the bearing member, threaded shafts disposed longitudinally of the casing and having their ends mounted for rotation in the bearing members, a frame disposed transversely between and engaging the threaded shafts, whereby rotation of the latter will move the frame longitudinally of the casing, a lens within the frame and means located within the casing between one end of the latter and the adjacent bearing member, whereby the shafts may be rotated.

In testimony whereof I affix my signature.

FRANK J. NOWAK.